(12) United States Patent
Haruta et al.

(10) Patent No.: US 12,384,893 B2
(45) Date of Patent: Aug. 12, 2025

(54) BIAXIALLY ORIENTED POLYESTER FILM

(71) Applicant: TOYOBO CO., LTD., Osaka (JP)

(72) Inventors: Masayuki Haruta, Inuyama (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 498 days.

(21) Appl. No.: 17/426,626

(22) PCT Filed: Jan. 30, 2020

(86) PCT No.: PCT/JP2020/003364
§ 371 (c)(1),
(2) Date: Jul. 28, 2021

(87) PCT Pub. No.: WO2020/166353
PCT Pub. Date: Aug. 20, 2020

(65) Prior Publication Data
US 2022/0056223 A1 Feb. 24, 2022

(30) Foreign Application Priority Data
Feb. 14, 2019 (JP) .................... 2019-024307

(51) Int. Cl.
| | |
|---|---|
| *C08J 5/18* | (2006.01) |
| *B29C 48/00* | (2019.01) |
| *B29C 55/12* | (2006.01) |
| *B29K 67/00* | (2006.01) |
| *B29L 7/00* | (2006.01) |
| *C08G 63/83* | (2006.01) |

(52) U.S. Cl.
CPC ............ *C08J 5/18* (2013.01); *B29C 48/0018* (2019.02); *B29C 55/12* (2013.01); *C08G 63/83* (2013.01); *B29K 2067/00* (2013.01); *B29K 2995/0012* (2013.01); *B29K 2995/0053* (2013.01); *B29K 2995/0097* (2013.01); *B29L 2007/008* (2013.01); *C08J 2367/00* (2013.01)

(58) Field of Classification Search
CPC ...... C08J 5/18; C08J 2367/00; C08J 2367/02; C08J 2467/02; B29C 48/0018; B29C 55/12; B29C 2948/92704; B29C 2948/92933; B29C 48/08; B29C 48/305; B29C 48/40; B29C 48/92; B29C 55/143; B29C 55/146; C08G 63/83; C08G 63/84; C08G 63/87; C08G 63/183; B29K 2067/00; B29K 2995/0012; B29K 2995/0053; B29K 2995/0097; B29L 2007/008; B32B 2264/1021; B32B 2264/1022; B32B 2264/1023; B32B 2264/1027; B32B 2264/104; B32B 2270/00; B32B 2307/412; B32B 2307/518; B32B 2307/736; B32B 2439/00; B32B 2519/00; B32B 27/08; B32B 27/16; B32B 27/36; C08L 67/02; C08L 2205/025; C08K 3/2279; G09F 3/02; G09F 2003/0255

See application file for complete search history.

(56) References Cited

U.S. PATENT DOCUMENTS

| | | | |
|---|---|---|---|
| 7,208,565 B1 | 4/2007 | Nakajima et al. | |
| 2004/0058805 A1 | 3/2004 | Nakajima et al. | |
| 2005/0064140 A1* | 3/2005 | Furuya ................ | H05K 1/0326 428/209 |
| 2007/0149757 A1 | 6/2007 | Nakajima et al. | |
| 2012/0302676 A1* | 11/2012 | Oya ....................... | C08K 5/29 524/89 |
| 2013/0012665 A1 | 1/2013 | Nozawa et al. | |
| 2016/0237207 A1 | 8/2016 | Ohashi et al. | |

FOREIGN PATENT DOCUMENTS

| | | |
|---|---|---|
| EP | 2524940 A1 | 11/2012 |
| JP | 3461175 B2 | 10/2003 |
| JP | 3506236 B2 | 3/2004 |
| WO | WO 2010/100959 A1 | 9/2010 |
| WO | WO 2015/060335 A1 | 4/2015 |

OTHER PUBLICATIONS

English Translation of WO 2011/093478 A1, Oya et al.(Year: 2011).*
China National Intellectual Property Administration, Office Action in Chinese Patent Application No. 202080013603.9 (Aug. 24, 2022).
European Patent Office, Extended European Search Report in European Patent Application No. 20756639.9 (Jul. 25, 2022).
Intellectual Property India, Examination Report in Indian Patent Application No. 202147038023 (Jan. 6, 2023).
China National Intellectual Property Administration, Second Office Action in Chinese Patent Application No. 202080013603.9 (Jun. 1, 2023).
Japanese Patent Office, International Search Report in International Patent Application No. PCT/JP2020/003364 (Apr. 14, 2020).
China National Intellectual Property Administration, Office Action in Chinese Patent Application No. 202080013603.9 (Mar. 1, 2024).
China National Intellectual Property Administration, Third Office Action in Chinese Patent Application No. 202080013603.9 (Nov. 15, 2023).

(Continued)

*Primary Examiner* — Nathan L Van Sell
(74) *Attorney, Agent, or Firm* — Leydig, Voit & Mayer, Ltd.

(57) ABSTRACT

To provide a biaxially oriented polyester film that has extremely low content of antimony, excellent hygiene, few foreign substances, excellent transparency and heat resistance, and is excellent in printability, workability, and productivity. A biaxially oriented polyester film characterized by a content of antimony in the film of 10 ppm or less, a content of phosphorus in the film of 25 ppm or more and 75 ppm or less, an intrinsic viscosity of the film of 0.51 dl/g or more and 0.70 dl/g or less, and a number of defects with a size of 1 mm or more is 1.0 or less per 1000 square meters of the film.

10 Claims, No Drawings

(56) References Cited

OTHER PUBLICATIONS

Intellectual Property India, Hearing Notice in Indian Patent Application No. 202147038023 (Dec. 6, 2023).
Korean Intellectual Property Office, Office Action in Korean Patent Application No. 10-2021-7028958 (Jan. 22, 2025).

* cited by examiner

BIAXIALLY ORIENTED POLYESTER FILM

CROSS-REFERENCE TO RELATED APPLICATIONS

This patent application is the U.S. national phase of International Patent Application No. PCT/JP2020/003364, filed Jan. 30, 2020, which claims the benefit of Japanese Patent Application No. 2019-024307, filed on Feb. 14, 2019, which are incorporated by reference in their entireties herein.

TECHNICAL FIELD

The present invention relates to a biaxially oriented polyester film that has excellent hygiene, printability, workability, and productivity.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packaging materials, and automobiles. Among plastic films, biaxially oriented PET films have been used widely for industrial and packaging fields because of their excellent balance between cost and mechanical characteristic strength, heat resistance, dimensional stability, chemical resistance, optical characteristics, etc.

In the field of industrial films, biaxially oriented PET films can be used as functional films for flat panel displays (FPD) such as liquid crystal displays and plasma displays because of their excellent transparency. Furthermore, PET films to which hydrolysis resistance is imparted have been used as films for solar cell back sheets and also used for various purposes as functional films and base films.

In the field of packaging films, biaxially oriented PET films have been used for applications such as foodstuff packaging and gas barrier films. Especially, films excellent in gas barrier properties have been used as packaging materials required to have air-tightness for foodstuff, pharmaceutical products, electronic parts, and so on, or as gas shielding materials, and there has been a growing demand for such films in recent years.

However, since a packaging film comes into direct contact with foodstuff, the polyester film desirably contains few foreign substances from the viewpoint of hygiene. In addition, since an antimony catalyst used in the process of producing (polymerizing) a polyester raw material may be carcinogenic, the polyester film desirably contains as little antimony as possible or no antimony.

Conventionally, as described in Patent Literatures 1 and 2, for example, there are polyester raw materials produced without using an antimony catalyst. However, Patent Literatures 1 and 2 do not describe a method of reducing the number of foreign substances in the film, and desired film properties.

PRIOR ART DOCUMENT

Patent Documents

Patent Document 1: Japanese Patent No. 3461175
Patent Document 2: Japanese Patent No. 3506236

SUMMARY OF THE INVENTION

Problems to be Solved by the Invention

The object of the present invention is to provide a biaxially oriented polyester film that has an extremely low content of antimony, that contains few foreign substances, and that is excellent in transparency and heat resistance as well as excellent in printing processability and print appearance; and a method for producing a film roll formed by winding such a polyester film.

Solutions to the Problems

The present invention, which provides solutions to the above problems, comprises the following.

[1] A biaxially-oriented polyester film characterized by satisfying the following requirements (1) to (4):
(1) a content of antimony in the film is 10 ppm or less;
(2) a content of phosphorus in the film is 25 ppm or more and 75 ppm or less;
(3) an intrinsic viscosity of the film is 0.51 dl/g or more and 0.70 dl/g or less; and
(4) a number of defects with a size of 1 mm or more is 1.0 or less per 1000 square meters of the film.

[2] The polyester film according to [1], wherein the polyester film is formed with a polyester resin as a polyester raw material containing at least one selected from aluminum compounds and at least one selected from phosphorus compounds as polymerization catalysts.

[3] The polyester film according to [1] or [2], wherein the film has a haze of 1% or more and 8% or less.

[4] The polyester film according to any one of [1] to [3], wherein the film has a heat-shrinkage ratio in a longitudinal direction of 0.8% or more and 3% or less, measured at 150° C. for 15 minutes.

[5] The polyester film according to any one of [1] to [4], wherein the film has a value of irregularity of thickness in each of a longitudinal direction and a transverse direction of 1% or more and 10% or less, measured over a length of 1 m with a continuous contact-type thickness gauge.

[6] A packaging bag including one or more layers, wherein at least one of the layer is the biaxially-oriented polyester film according to any one of [1] to [5].

[7] A label including one or more layers, wherein at least one of the layer is the biaxially-oriented polyester film according to any one of [1] to [5].

[8] A method for producing the biaxially-oriented polyester film according to any one of [1] to [5],
wherein a raw material polyester resin is melt-extruded such that a difference between an intrinsic viscosity of the raw material polyester resin and an intrinsic viscosity of the polyester film is 0.06 dl/g or less, and then cooled and solidified to obtain an unstretched film, and subsequently, the unstretched film is subjected to a biaxial stretching and then to a heat setting treatment.

Effect of the Invention

According to the present invention, there can be provided a biaxially-oriented polyester film that has an extremely low content of antimony, that contains few foreign substances, and that is excellent in transparency and heat resistance as well as excellent in printing processability and print appearance; and a method for producing a film roll formed by winding such a polyester film.

DESCRIPTION OF EMBODIMENTS

The following is a description of embodiments of the present invention. The present invention is not to be construed as limited to the following embodiments, including examples, and various changes may be made within the scope of achieving the purpose of the invention and not deviating from the gist of the invention.

(Raw Material Polyester Resin)

The biaxially-oriented polyester film of the present invention contains a polyethylene terephthalate-based resin as a constituent component. Here, the polyethylene terephthalate-based resin contains an ethylene glycol-derived component and a terephthalic acid-derived component as main constituent components. The "main constituent components" mean that terephthalic acid is contained in an amount of 80 mol % or more based on 100 mol % of all dicarboxylic acids constituting polyester, and ethylene glycol is contained in an amount of 80 mol % or more based on 100 mol % of all glycol components constituting polyester.

As far as the object of the present invention is not hindered, a different dicarboxylic acid component and a different glycol component may be copolymerized with the main constituent components. The copolymerization amount proportions of the different dicarboxylic acid component and the different glycol component are each less than 20 mol %, preferably 10 mol % or less, and particularly preferably 5 mol % or less based on the total amount of dicarboxylic acid components or the total amount of glycol components.

Examples of the different dicarboxylic acid components include aromatic dicarboxylic acids such as isophthalic acid, phthalic acid, naphthalene dicarboxylic acid, 4,4'-dicarboxybiphenyl, and sodium 5-sulfoisophthalate; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid, and dimer acid; and the like.

Examples of the different glycol components include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; ethylene oxide adducts or propylene oxide adducts of bisphenol A, bisphenol S, bisphenol C, bisphenol Z, bisphenol AP, and 4,4'-biphenol; alicyclic glycols such as 1,2-cyclohexanedimethanol, 1,3-cyclohexanedimethanol, and 1,4-cyclohexanedimethanol; polyethylene glycol; polypropylene glycol; and the like.

As a polymerization method of such a polyethylene terephthalate-based resin, there can be employed any production method such as a direct polymerization method in which terephthalic acid, ethylene glycol, and, if necessary, the different dicarboxylic acid component and the different glycol component are allowed to react directly; and a transesterification method in which a dimethyl ester of terephthalic acid (and, if necessary, a methyl ester of the different dicarboxylic acid component) and ethylene glycol (and, if necessary, the different glycol component) are subjected to a transesterification reaction, followed by polycondensation reaction.

As the polyester resin, recycled resin obtained through recycling PET bottles or polyester resin containing a monomer component derived from biomass can also be used.

The biaxially-oriented polyester film of the present invention may contain, as a constituent component, other resins such as polyamide, polystyrene, polyolefin, and polyester other than those described above. From the viewpoints of mechanical properties and heat resistance of the biaxially-oriented polyester film, the content of the other resins is preferably 30% by mass or less, more preferably 20% by mass or less, even more preferably 10% by mass or less, particularly preferably 5% by mass or less, and most preferably 0% by mass (the total resin components constituting the polyester film are substantially a polyethylene terephthalate-based resin), relative to the total amount of all resin components of the polyester film.

The intrinsic viscosity of the polyethylene terephthalate-based resin is preferably in the range of 0.57 to 0.76 dl/g, more preferably 0.60 to 0.73 dl/g, and further preferably 0.63 to 0.7 dl/g. The intrinsic viscosity of less than 0.57 dl/g makes an obtained polyester film likely to tear during the production (so-called breakage occurs). The intrinsic viscosity of more than 0.76 dl/g increases the filtration pressure and makes high precision filtration difficult to be performed, causing difficulty in performing resin extrusion through a filter.

Furthermore, the intrinsic viscosity of resin in the polyester film is preferably in the range of 0.51 to 0.70 dl/g, more preferably 0.56 to 0.68 dl/g, and further preferably 0.59 to 0.65 dl/g. The intrinsic viscosity of less than 0.51 dl/g makes an obtained polyester film likely to tear in a processing step such as printing. The intrinsic viscosity of more than 0.76 dl/g makes the effect of improving the mechanical properties likely to be saturated.

(Polymerization Catalyst)

Next, a polymerization catalyst used in producing the raw material polyester resin used in the present invention will be described. The polymerization catalyst used in the present invention is a polymerization catalyst which is characterized by having an ability of promoting esterification. In the present invention, as described later, it is preferable not to use a polymerization catalyst of an antimony compound such as antimony trioxide, which has been conventionally used, if possible. As the polymerization catalyst which is characterized by having an ability of promoting esterification, a polymerization catalyst containing at least one selected from aluminum compounds and at least one selected from phosphorus compounds is preferably used.

As the aluminum compound constituting the polymerization catalyst used for a synthesis of the raw material polyester resin used in the present invention, any known aluminum compounds can be used without limitation.

Specific examples of the aluminum compounds include aluminum acetate, basic aluminum acetate, aluminum lactate, aluminum chloride, aluminum hydroxide, aluminum hydroxychloride, an organic aluminum compound such as aluminum acetylacetonate and aluminum oxalate, and partial hydrolysates thereof. Among them, a carboxylate, an inorganic acid salt, and a chelate compound are preferred. Among them, aluminum acetate, basic aluminum acetate, aluminum lactate, aluminum chloride, aluminum hydroxide, aluminum hydroxychloride, and aluminum acetylacetonate are more preferred; aluminum acetate, basic aluminum acetate, aluminum chloride, aluminum hydroxide, and aluminum hydroxychloride are further preferred; and aluminum acetate and basic aluminum acetate are most preferred.

The amount of the aluminum compound used in the polymerization catalyst in the present invention is set so that preferably 1 to 80 ppm, more preferably 2 to 60 ppm, further preferably 3 to 50 ppm, especially preferably 5 to 40 ppm, and most preferably 10 to 30 ppm of aluminum atoms remains relative to the total mass of the resulting polyester resin.

When the amount of the aluminum compound is less than the above range, there is a possibility of resulting in poor catalytic activity, and when the amount of the aluminum compound is more than the above range, there is a possibility of inducing generation of aluminum-based foreign substances.

Almost 100% of the used amount of the aluminum compound remains even under a reduced pressure environment at the time of polyester polymerization. Accordingly, the used amount may be considered to be equal to a residual amount.

Although there is no particular limitation on the phosphorus compound to be used as the polymerization catalyst, it is preferable to use a phosphonic acid-type compound or a phosphinic acid-type compound because the effect of improving the catalytic activity is great. It is particularly preferable to use a phosphonic acid-type compound because the effect of improving the catalytic activity is especially great.

Among the phosphorus compounds, phosphorus compounds having a phenol moiety in the same molecule are preferred. While any phosphorus compounds having a phenol structure can be used without any limitation, it is preferable to use one or two or more compounds selected from the group consisting of phosphonic acid-based compounds and phosphinic acid-based compounds having a phenol moiety in the same molecule because the effect of improving the catalytic activity is great. Among these, it is preferable to use one or two or more phosphonic acid-based compounds having a phenol moiety in the same molecule because the effect of improving the catalytic activity is especially great.

As examples of phosphorus compounds having a phenol moiety in the same molecule, compounds represented by the following general formulas (1) and (2) can be given.

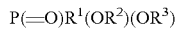   Formula (1)

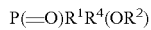   Formula (2)

In the formulas (1) and (2), $R^1$ represents a hydrocarbon group having 1 to 50 carbon atoms including a phenol moiety, or a hydrocarbon group having 1 to 50 carbon atoms including a substituent such as a hydroxyl group, a halogen group, an alkoxyl group or an amino group, and a phenol moiety. $R^4$ represents hydrogen, a hydrocarbon group having 1 to 50 carbon atoms, or a hydrocarbon group having 1 to 50 carbon atoms including a substituent such as a hydroxyl group, a halogen group, an alkoxyl group or an amino group. $R^2$ and $R^3$ each independently represent hydrogen, a hydrocarbon group having 1 to 50 carbon atoms, or a hydrocarbon group having 1 to 50 carbon atoms including a substituent such as a hydroxyl group or an alkoxyl group. However, the hydrocarbon group may contain a branched structure, an alicyclic structure such as cyclohexyl, or an aromatic ring structure such as phenyl or naphthyl. Terminals of $R^2$ and $R^4$ may bind to each other.

Examples of the phosphorus compound having a phenol moiety in the same molecule include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenyl phosphinic acid, methyl p-hydroxyphenylphenylphosphinate, phenyl p-hydroxyphenylphenylphosphinate, p-hydroxyphenylphosphinic acid, methyl p-hydroxyphenylphosphinate, and phenyl p-hydroxyphenylphosphinate. Besides these, a phosphorus compound represented by the following general formula (3) can be mentioned.

Formula (3)

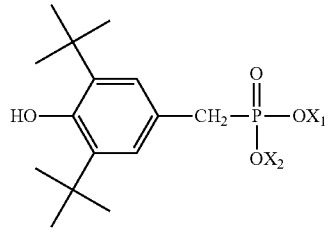

In the formula (3), $X_1$ and $X_2$ each represent hydrogen, an alkyl group having 1 to 4 carbon atoms, or mono- or more-valent metal.

$X_1$ may be bi- or more-valent metal, and $X_2$ may not exist. Further, an anion corresponding to an excessive valence of metal with respect to the phosphorus compound may be arranged.

As the metal, Li, Na, K, Ca, Mg, and Al are preferred.

By adding such a phosphorus compound having a phenol moiety in the same molecule at the time of polyester polymerization, the catalytic activity of the aluminum compound improves, and the thermal stability of the polymerized copolymerized polyester resin also improves.

Among the aforementioned phosphorus compounds, at least one phosphorus compound selected from the compounds represented by the formulas (4) and (5) is preferably used as a polycondensation catalyst.

Formula (4)

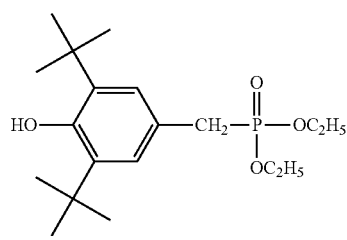

Formula (5)

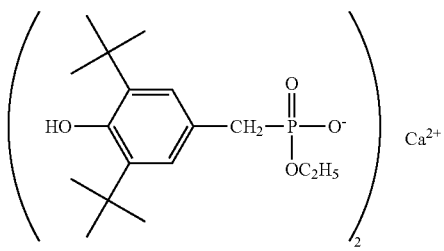

As a compound represented by the formula (4), Irganox 1222 (manufactured by BASF) is commercially available. As a compound represented by the formula (5), Irganox 1425 (manufactured by BASF) is commercially available and usable.

The amount of the phosphorus compound used in the polymerization catalyst in the present invention is set so that preferably 10 to 100 ppm, more preferably 15 to 90 ppm, further preferably 20 to 80 ppm, particularly preferably 25 to 70 ppm, and most preferably 30 to 60 ppm of phosphorus atoms remains relative to the total mass of the resulting raw material polyester resin.

When phosphorus atoms remain in an amount exceeding the above upper limit or below the above lower limit, the polymerization activity may be deteriorated.

When the phosphorus compound is put under a reduced pressure environment at the time of polyester polymerization, about 10 to 30% of the used amount is removed to an outside of the system depending on the conditions. In light of this, it is necessary to conduct a trial experiment several times to find the remaining percentage of the phosphorus compound in polyester, and then to determine the amount to be used.

Also, by using the above phosphorus compound, it is possible to improve the heat resistance of the resin. Although the reason is unclear, it is considered that the heat resistance of the polyester resin is improved by the hindered phenol moiety in the phosphorus compound.

If the remaining amount of the phosphorus compound is less than 10 ppm, the effect of improving the heat resistance is weakened, and as a result, the effect of improving the heat resistance and the coloring of the polyester resin of the present invention may be lost.

In order to further improve the catalytic activity as long as the effect of the present invention is not impaired, a metal-containing polycondensation catalyst such as an antimony compound, a titanium compound, a tin compound, or a germanium compound may be used together. In that case, the amount of the antimony compound is preferably 10 ppm or less in terms of an antimony atom relative to the mass of the obtained copolymerized polyester resin. The amount of the germanium compound is preferably 10 ppm or less in terms of a germanium atom relative to the mass of the obtained polyester resin. The amount of the titanium compound is preferably 3 ppm or less in terms of a titanium atom relative to the mass of the obtained polyester resin. The amount of the tin compound is preferably 3 ppm or less in terms of a tin atom relative to the mass of the obtained polyester resin. Considering the object of the present invention, it is preferable not to use these metal-containing polycondensation catalysts such as an antimony compound, a titanium compound, a tin compound, and a germanium compound, if possible.

In the present invention, in addition to the aluminum compound, a small amount of at least one selected from the group of alkali metal, alkaline earth metal, and a compound thereof may coexist as a second metal-containing component. The coexistence of the second metal-containing component in the catalyst system is effective for improving the catalytic activity as well as suppressing generation of diethylene glycol, and thus effective for giving a catalyst component with improved reaction speed and improving the productivity. When alkali metal, alkaline earth metal, or a compound thereof is used in combination, the used amount (mol %) thereof is preferably $1 \times 10^{-5}$ to 0.01 mol % relative to the molar number of the dicarboxylic acid component constituting the polyester resin. Almost 100% of the used amount of alkali metal, alkaline earth metal or a compound thereof remains even under a reduced pressure environment at the time of polyester polymerization. Accordingly, the used amount may be considered to be equal to a residual amount.

The polymerization catalyst according to the present invention has catalytic activities not only in the polycondensation reaction, but also in esterification reaction and transesterification reaction. Transesterification reaction between an alkyl ester of a dicarboxylic acid, such as dimethyl terephthalate, and a glycol such as ethylene glycol is generally conducted in the presence of a transesterification catalyst such as zinc, but in place of this catalyst, the catalyst of the present invention can be used. The polymerization catalyst according to the present invention has catalytic activities not only in melt polymerization but also in solid phase polymerization and solution polymerization.

The polymerization catalyst of polyester used in the present invention can be added to the reaction system in any stage of polymerization. For example, the polymerization catalyst can be added to the reaction system in any stage before starting and during esterification or transesterification reaction, or in any stage just before starting of polycondensation reaction or during polycondensation reaction. In particular, it is preferred to add the aluminum compound and the phosphorus compound according to the present invention just before starting of polycondensation reaction.

(Preferred Production Method of Biaxially-Oriented Polyester Film)

The biaxially-oriented polyester film of the present invention may have a single-layer structure or a laminated structure of two layers, three layers, or four or more layers. In the case of a laminated structure of two or more layers, each layer contains, as described above, polyethylene terephthalate-based resin, inorganic particles, and a resin other than polyethylene terephthalate-based resin, as constituent components. It is preferable that the types or contents of any of the constituent components of the layers adjacent to each other be different.

In the case of a single-layer structure composed of a layer A, the layer A in the present invention constitutes the entire biaxially-oriented polyester film.

In the case of a two-layer structure including the layer A, the layer A in the present invention is either one or both of two layers. In the case of a three-layer structure including the layer A, the layer A in the present invention is any one of three layers, or two surface layers on both sides.

In particular, in the case of the three-layer structure, the surface roughness of the film can be controlled by controlling the amount of addition of particles only in the surface layer part even if the inner layer contains no inorganic particles, and the content of inorganic particles in the film can be reduced. Since smell components escape through voids formed at the boundary between the inorganic particles and the polyester resin, such a three-layer structure leads also to the improvement of deterioration in a flavor retention property of the film.

Further, within a range which does not adversely affect the properties of the film surface, it becomes easier to mix and use a recovered material of which edges generated in a film formation process are trimmed, a recycled material in another film formation process, or the like in the inner layer at an appropriate time, which is advantageous from a cost point of view.

As the inorganic particles, for example, silica, alumina, titanium dioxide, calcium carbonate, kaolin, barium sulfate and the like can be used. The average particle size of the inorganic particles is preferably within the range of about 0.05 to 3.0 μm as measured by a Coulter counter. The lower limit of the content of the inorganic particles in the film is preferably 0.01% by weight, more preferably 0.015% by weight, and further preferably 0.02% by weight. If the lower limit is less than 0.01% by weight, slipperiness may deteriorate. The upper limit of the content of the inorganic particles in the film is preferably 1% by weight, more preferably 0.2% by weight, and further preferably 0.1% by weight. The upper limit of more than 1% by weight is not so preferred because it may lead to deterioration in transparency.

Examples of a method for incorporating inorganic particles into polyester include a method in which inorganic particles are dispersed in ethylene glycol, which is a diol component, at a predetermined ratio in a form of slurry, and the resulting ethylene glycol slurry is added at an arbitrary stage before the completion of polyester polymerization.

In this method, when the particles are added, for example, if water sol or alcohol sol obtained during the synthesis of the particles is added without being dried once, the dispersibility of the particles becomes better, and thereby the generation of large protrusions can be suppressed.

Further, a method in which water slurry of particles is mixed directly with predetermined polyester pellets, and the mixture is supplied to a vent-type twin-screw kneading extruder to knead the mixture into polyester is also effective.

In the present invention, it is preferable to control a resin temperature of an extruder to a temperature not lower than the melting point of the resin +2° C. and not higher than the melting point of the resin +6° C. to perform extrusion. When the extrusion temperature is lower than the melting point +2° C., the resin does not melt, and the unmelted material is discharged and, unfavorably, becomes a foreign substance. When extrusion is performed at a temperature higher than the melting point +6° C., the resin is thermally deteriorated, causing the generation of a foreign substance.

The extruded sheet-shaped molten resin is extruded with a T-die and then rapidly cooled to obtain an unstretched film. As a method for rapidly cooling the molten resin, a method in which the molten resin is cast onto a rotating drum from a T-die and rapidly cooled and solidified to obtain a substantially unoriented resin sheet may be suitably employed.

A sublimated material (oligomer or the like) of the molten resin is prone to deposit on the T-die. When the deposited material falls off, it adheres to the unstretched sheet and, unfavorably, becomes a foreign substance in the film. Therefore, it is preferable to attach a sticky sheet to the T-die in advance to avoid the sublimated material from easily falling off. Further, in order to avoid the foreign substance from transferring to the unstretched sheet even if the foreign substance adheres to a cooling roll, it is preferable to clean the cooling roll with a cleaner even during operation.

Further, the obtained unstretched film is biaxially stretched and then subjected to heat setting treatment and heat relaxation treatment. By appropriately combining the following stretching conditions in the longitudinal direction and the width direction, and the film formation conditions such as heat setting conditions and heat relaxation conditions, the preferred film properties described later can be achieved. This will be described below in detail.

The stretching method can be either simultaneous biaxial stretching or sequential biaxial stretching. The sequential biaxial stretching is preferable from the viewpoint that the film formation rate can be increased to provide high productivity. Below described is a sequential-biaxial stretching method by longitudinal stretching-transverse stretching in which a longitudinal stretching is performed first, and then a transverse stretching is performed. This order may be reversed to be transverse stretching-longitudinal stretching.

The stretch temperature in the longitudinal (machine) direction (hereinafter, may be abbreviated as MD) is preferably (Tg+15)° C. to (Tg+55)° C., and the stretch ratio in the longitudinal direction is preferably 3.3 to 4.7 times, from the point of view of reducing bowing. When the stretch temperature is higher than (Tg+55)° C., or the stretch ratio is less than 3.3 times, bowing is reduced, but the molecular orientation in the width direction becomes too large compared with that in the longitudinal direction, unfavorably resulting in being out of orientation balance. Further, it is unfavorable because the flatness of the obtained biaxially-oriented polyester film is also deteriorated. When the stretch temperature is lower than (Tg+15)° C. or the stretch ratio is more than 4.7 times, the shrinkage stress increases, and bowing increases, which is unfavorable.

In the stretching in the longitudinal direction, in a method of performing stretching in multiple stages between multiple rolls instead of stretching in one stage, the film is gradually stretched in the longitudinal direction while controlling the stretching speed, so that variation in physical properties in the film width direction can be reduced. Two- to five-stage stretching is preferable from the viewpoints of effect, equipment, and cost.

In the stretching in the width (transverse) direction (hereinafter, may be abbreviated as TD), the unstretched film is introduced to a tenter capable of heating with both ends of the film held with clips, heated to a predetermined temperature with hot air, and then stretched in the width direction by increasing the distance between the clips while transporting the film in the longitudinal direction.

If the stretch temperature in the width direction is lower than Tg+5° C., breakage is, unfavorably, prone to occur during stretching of the film. If the stretch temperature is higher than Tg+40° C., uniform stretching in the width direction cannot be performed, and irregularity of thickness in the width direction becomes large, so that variation in hardness of the film roll unfavorably increases. The stretch temperature in the width direction is more preferably Tg+8° C. or higher and Tg+37° C. or lower, and further preferably Tg+11° C. or higher and Tg+34° C. or lower.

The stretch ratio in the width direction is not particularly specified, but is preferably 2 times or more and 6 times or less. If the stretch ratio is less than 2 times, it is difficult to achieve a high yield in terms of material balance, the mechanical strength is lowered, and in addition, the irregularity of thickness in the width direction may cause variation in hardness of the film roll. Further, if the stretch ratio exceeds 6 times, breakage is, unfavorably, prone to occur during film formation by stretching.

The heat setting temperature (heat treatment temperature) after the TD stretching is preferably 220 to 245° C. When the heat setting temperature is higher than 245° C., bowing unfavorably increases. When the heat setting temperature is lower than 220° C., the heat-shrinkage ratio becomes high in both the longitudinal direction and the width direction, and thermal dimensional stability during a vapor deposition process deteriorates. Further, when the heat fixing temperature after the TD stretching exceeds 245° C., bowing unfavorably increases.

In a heat relaxation treatment step, until the film has been shrunk due to heat relaxation, a binding force in the width direction decreases so that the film may slacken due to its own weight, or the film may bow due to an accompanying airflow, and thus, the film is very likely to move up and down. Therefore, in the heat relaxation step, the amount of change in the orientation angle and the amount of change in difference in oblique heat-shrinkage ratios of the resulting biaxially-oriented polyester film may greatly vary depending on the transport state of the film. For reducing such variation, for example, the film can be kept parallel by appropriately adjusting the speeds of winds blowing from upper and lower nozzles. The heat relaxation ratio in the width direction is preferably 4 to 8%. When the heat relaxation ratio is less than 4%, the heat-shrinkage ratio in the width direction of the resulting biaxially-oriented polyester film becomes high, and dimensional stability during a vapor deposition process unfavorably deteriorates. When the heat relaxation ratio is larger than 8%, bowing increases and slackening occurs, the irregularity of thickness in the width direction increases, and thus variation in hardness of the film roll unfavorably increases.

The film formed by stretching by the above method is wound by a winder to produce a master roll. In a subsequent slitting process, while applying tension in the longitudinal direction of the film and further applying pressure (hereinafter referred to as surface pressure) with a contact roll from above the roll, the master roll is slit into an arbitrary width and wound as a product film roll.

(Structure and Properties of Biaxially-Oriented Polyester Film)

In the biaxially-oriented polyester film of the present invention, the content of antimony in the film is preferably 10 ppm or less. Since antimony is a substance that is suspected of being carcinogenic, the smaller the content, the better. The content of antimony in the film is preferably 5 ppm, and more preferably 0 ppm. The content of antimony in the raw material resin used in the present invention is preferably 0 ppm, but is set to 10 ppm or less because there is a possibility of incorporation of antimony during the production.

In the biaxially-oriented polyester film of the present invention, the number of defects with a size of 1 mm or more is preferably 1 or less per 1000 square meters (for example, per film width of 500 mm and film winding length of 2000 m) of the film. By thus reducing the number of defects with a size of 1 mm or more per large area of 1000 square meters ($m^2$) to 1 or less, the printability becomes very good. When the number of defects due to foreign substances is large, omission of ink may unfavorably occur in printing. A smaller number of defects with a size of 1 mm or more is preferable. The number of defects with a size of 1 mm or more is more preferably 0.5 or less, further preferably 0.3 or less, particularly preferably 0.1 or less, and most preferably 0. In the present invention, the number of defects with a size of 1 mm or more is set to 1 or less since there is a possibility of incorporation of a foreign substance when an unexpected trouble happens.

In the biaxially-oriented polyester film of the present invention, the difference between the intrinsic viscosity of the polyester resin and the intrinsic viscosity of the polyester film is preferably 0.06 dl/g or less. This difference in intrinsic viscosity is an index of the degree of deterioration when the polyester resin is melt-extruded. If the difference in intrinsic viscosity is higher than 0.06 dl/g, the resin deteriorates in an extruder, resulting in generation of a foreign substance. The difference in intrinsic viscosity is preferably 0 dl/g, but it is difficult to make it 0 dl/g because the resin is substantially melted. The difference in intrinsic viscosity is preferably 0.05 dl/g or less, and more preferably 0.04 dl/g or less.

In order to control the difference in intrinsic viscosity as described above, in the present invention, it is preferable to control a resin temperature of an extruder to a temperature not lower than the melting point of the resin +2° C. and not higher than the melting point of the resin +6° C. to perform extrusion. When the extrusion temperature is lower than the melting point +2° C., the resin does not melt, and the unmelted material is discharged and, unfavorably, becomes a foreign substance. When extrusion is performed at a temperature higher than the melting point +6° C., the resin is thermally deteriorated and becomes a foreign substance.

The biaxially-oriented polyester film of the present invention preferably has a haze of 1% or more and 8% or less. A film having a haze of higher than 8% is not preferable because the transparency of the film is impaired. Although a lower haze is preferred, the lower limit of the haze is set to 1% in order to impart slipperiness in the present invention. The haze is preferably 7% or less, and more preferably 6% or less.

The biaxially-oriented polyester film of the present invention preferably has a heat-shrinkage ratio in the longitudinal direction of 0.8% or more and 3% or less, measured at 150° C. for 15 minutes. If the heat-shrinkage ratio in the longitudinal direction is more than 3%, the film shrinks when dried in a post-printing process, causing displacements of printed patterns, and the like. Even if the heat-shrinkage ratio in the longitudinal direction is less than 0.8%, no problem occurs, but since the lower limit of the heat-shrinkage ratio in the longitudinal direction was 0.8% in the production method of the present invention, it is set to 0.8% or more. The upper limit of the heat-shrinkage ratio in the longitudinal direction is preferably 2.5% or less, and more preferably 2% or less. The value of the heat-shrinkage ratio is calculated by the equation (3) described later.

When the irregularity of thickness in each of the longitudinal direction and the transverse direction of the biaxially-oriented polyester film of the present invention is measured over a length of 1 m, it is preferable that the irregularity of thickness in each of the longitudinal direction and the transverse direction of the film be 1% or more and 10% or less. If the irregularity of thickness is larger than 10%, printing omission and meandering due to wrinkles occur during processing such as printing. A smaller irregularity of thickness in each of the longitudinal direction and the transverse direction of the film is preferable, but in the present invention, the lower limit of irregularity of thickness is about 1%. The irregularity of thickness in each of the longitudinal direction and the transverse direction is more preferably 8% or less, and further preferably 6% or less.

The thickness of the biaxially-oriented polyester film of the present invention is not particularly specified, but is preferably 2 m or more and 300 m or less. If the thickness is less than 2 m, the stiffness of the film is insufficient, so that wrinkles are prone to occur in processing such as printing, and further, troubles are prone to occur in the process of producing bags and labels with the film due to the insufficient stiffness. No problem occurs even if the thickness is large, but the thickness of larger than 300 m is not preferable because it goes against the trend toward decreased volume by decrease in thickness from environmental and cost points of view. The thickness is more preferably 4 m or more and 250 m or less, and further preferably 6 m or more and 200 m or less.

The width of a product film roll of the biaxially-oriented polyester film of the present invention is not particularly specified, but is preferably 300 mm or more and 5000 mm or less. If the width is less than 300 mm, the efficiency in printing and processing may be lowered. No problem occurs even if the width is large, but since a too large width may lead to extensive handling in printing and processing steps, the width of more than 5000 mm is not preferable. The width of the film roll is more preferably 400 mm or more and 4500 mm or less, and further preferably 500 mm or more and 4000 mm or less.

EXAMPLES

Hereinafter, the present invention will be described in more detail by way of examples. However, the present invention is not limited in any way to the form of these examples, and may be changed as appropriate without departing from the purpose of the present invention. The compositions of the raw materials used in the examples and comparative examples, and the stretching method and manufacturing conditions of the films in the examples and comparative examples are shown in the following tables.

The film evaluation method is as follows.

[Tg (Glass Transition Point), Tm (Melting Point)]

Using a differential scanning calorimeter (DSC220 manufactured by Seiko Instruments & Electronics Ltd.), 5 mg of an unstretched film was put in a sample pan, the lid of the pan was closed, and the temperature was raised at a temperature rise rate of 10° C./minute from −40° C. to 300° C. in a nitrogen gas atmosphere to conduct a measurement. Tg (° C.) and Tm (° C.) were obtained based on JIS-K 7121-1987.

[Intrinsic Viscosity (IV)]

0.2 g of polyester was dissolved in 50 ml of a solvent mixture of phenol/1,1,2,2-tetrachloroethane (60/40 (weight ratio)), and the intrinsic viscosity was measured at 30° C. using an Ostwald viscometer. The unit is dl/g.

[Content of Each Atom in Polyester Film]

The content of each atom was quantified by the methods shown below.

(a) Antimony Atom

A sample (1 g) was subjected to wet decomposition in a mixed solution of sulfuric acid/aqueous hydrogen peroxide solution. After that, sodium nitrite was added thereto to change an Sb atom to $Sb^{5+}$, and Brilliant Green was added to produce a blue complex with Sb. This complex was extracted with toluene. Then, absorbance thereof at 625 nm wavelength was measured using an absorptiometer (UV-150-02 manufactured by Shimadzu), and the amount of Sb atom in the sample was determined by a colorimetry using a previously-prepared calibration curve.

(b) Phosphorus Atom

A sample (1 g) was subjected to dry incineration decomposition in the presence of sodium carbonate or wet decomposition in a mixed solution of sulfuric acid/nitric acid/perchlorate or a mixed solution of sulfuric acid/aqueous hydrogen peroxide solution to convert a phosphorus compound to orthophosphoric acid. After that, orthophosphoric acid was allowed to react with molybdate in a 1 mol/L sulfuric acid solution, and the resulting phosphomolybdic acid was reduced with hydrazine sulfate to prepare heteropoly blue. Absorbance thereof at 830 nm wavelength was measured using an absorptiometer (UV-150-02 manufactured by Shimadzu). The amount of phosphorus atom in the sample was determined using a previously-prepared calibration curve.

(c) Aluminum Atom

A sample (0.1 g) was dissolved in 6M hydrochloric acid solution, and the resulting solution was allowed to stand for one day and then diluted with pure water to prepare a 1.2M hydrochloric acid solution for measurement. The amount of aluminum atom in the sample was determined from the above-prepared solution sample by means of a high-frequency plasma emission spectrometry.

[Number of Defects]

A film roll having a width of 800 mm and a winding length of 10000 m (8000 square meters) was rewound using a rewinder. When the film roll was rewound, the number of defects was investigated using a defect detector (model F MAX MR) manufactured by FUTEC. Then, the number of defects with a size of 1 mm or more was determined either in the longitudinal direction or in the transverse direction. From the number of all the defects, the number of defects per 1000 square meters was calculated by the following equation (1).

$$\text{Number of defects per 1000 square meters} = \text{Number of all defects}/8 \quad \text{(Equation 1)}$$

[Printing]

On the film roll having a width of 800 mm and a winding length of 10000 m (8000 square meters) that had been subjected to investigation of defects, gravure printing was performed using a gravure printing machine (manufactured by Higashitani Tekkosho) at a speed of 100 m/min with halftone dots of 5%. At this time, an ink prepared by mixing a gravure printing ink (manufactured by Toyo Ink Co., Ltd.; trade name: Fine Star R92 Black) and a diluting solvent (manufactured by Toyo Ink Co., Ltd.; trade name: SL302) at a ratio of 77:23 was used. The obtained print sample was rewound using a rewinder. When the print sample was rewound, the number of printing omissions was investigated using a defect detector (model F MAX MR) manufactured by FUTEC. Then, the number of printing omissions with a size of 1 mm or more was determined either in the longitudinal direction or in the transverse direction. From the number of all the printing omissions, the number of printing omissions per 1000 square meters was calculated by the following equation (2).

$$\text{Number of printing omissions per 1000 square meters} = \text{Number of all printing omissions}/8 \quad \text{(Equation 2)}$$

[Heat-Shrinkage Ratio]

A film was sampled in a size of 10 mm width in the transverse direction and 220 mm length in the longitudinal direction. The sampled film was marked with marked lines at an interval of 200 mm in the longitudinal direction, and the interval (L0) between the marked lines was measured. Then, the film was sandwiched between sheets of paper, placed in a hot air oven of which temperature was controlled to 150° C., treated for 15 minutes, and then taken out. Thereafter, the interval (L) between the marked lines was measured, and the heat-shrinkage ratio was calculated by the following equation (3). Except for those mentioned above, the measurement was carried out according to JIS-C-2318.

$$\text{Heat-shrinkage ratio }(\%)\{(L0-L)/L0\}\times 100 \quad \text{(Equation 3)}$$

[Haze]

Measurement for haze was conducted at 23° C. according to JIS-K-7105 with a haze meter (300A manufactured by Nippon Denshoku Industries Co., Ltd.). The measurement was conducted twice, and an average value thereof was obtained.

[Irregularity of Thickness]

A film was sampled in a strip of 1 m length in the measurement direction and 40 mm width in the width direction. Using a continuous contact-type thickness gauge manufactured by MIKURON, the thickness of the film sample was continuously measured at a speed of 5 (m/minute). The irregularity of thickness of the film was calculated from the following equation 4.

Irregularity of thickness=(Maximum thickness−Minimum thickness)/Average thickness×100(%)  (Equation 4)

<Preparation of Polymerization Catalyst Solution>
(Ethylene Glycol Solution of Phosphorus Compound)

To a flask equipped with a nitrogen introduction tube and a cooling tube at normal temperature and normal pressure, 2.0 liters of ethylene glycol was added, and then 200 g of Irganox1222 (manufactured by BASF) represented by chemical formula (4) was added as a phosphorus compound while stirring at 200 rpm in a nitrogen atmosphere. After adding additional 2.0 liters of ethylene glycol, the set temperature of a jacket was changed to 196° C. to raise a temperature, and stirring was performed under reflux for 60 minutes from when the inner temperature reached 185° C. or higher. Then, heating was ceased, and the solution was immediately removed from the heat source and cooled to 120° C. or lower within 30 minutes while the nitrogen atmosphere was retained.

(Ethylene Glycol Solution of Aluminum Compound)

To a flask equipped with a cooling tube at normal temperature and normal pressure, 5.0 liters of pure water was added, and then 200 g of basic aluminum acetate (hydroxyaluminum diacetate) was added in the form of a slurry with pure water while stirring at 200 rpm. Further, pure water was added such that the overall volume would become 10.0 liters, and stirring was performed at normal temperature and normal pressure for 12 hours. Then, the set temperature of a jacket was changed to 100.5° C. to raise a temperature, and then stirring was performed under reflux for 3 hours from when the inner temperature reached 95° C. or higher. Stirring was ceased, and the solution was allowed to cool to room temperature. At this time, when undissolved particles were observed, the solution was filtered through a glass filter (3G) to obtain an aqueous solution of the aluminum compound.

Subsequently, 2.0 liters of the aqueous solution of the aluminum compound and 2.0 liters of ethylene glycol were placed at normal temperature and normal pressure in a flask equipped with a distillation apparatus, and stirring was performed for 30 minutes at 200 rpm, thereby to obtain a homogeneous mixed solution of water/ethylene glycol. Then, the set temperature of a jacket was changed to 110° C. to raise a temperature, and water was evaporated away from the solution. When the amount of the evaporated water reached 2.0 liters, heating was ceased, and the solution was allowed to cool to room temperature, thereby to obtain an ethylene glycol solution of the aluminum compound.

In the following description, "part(s)" represents "part(s) by mass".

In a reactor equipped with a stirrer, a thermometer, and a condenser for distillation, 2130 parts of terephthalic acid, 1955 parts of ethylene glycol, and 0.7 parts of triethylamine were added, and the temperature was gradually raised from 220° C. to 250° C. while removing an evaporated water to an outside of the system under pressurization at 0.35 MPa to perform esterification reaction. Subsequently, as the polymerization catalyst solution, a mixed solution of the ethylene glycol solution of the phosphorus compound and the ethylene glycol solution of the aluminum compound was added thereto so that the amount in terms of phosphorus atom was 0.047 mol % and the amount in terms of aluminum atom was 0.021 mol % with respect to the dicarboxylic acid component in the polyester resin. Then, an initial polymerization under a reduced pressure up to 1.3 kPa was performed over one hour, and at the same time, the temperature was raised up to 270° C. Further, a latter polymerization was performed at 0.13 kPa or less to obtain Polyester 1.

Polyesters 2 and 3 were produced in the same manner as in the production of Polyester 1 described above except partially modifying as follows. The composition and physical properties of each polyester are shown in Table 1.

The polyesters used in Examples and Comparative Examples are as follows:

Polyester 1: Polyethylene terephthalate (IV: 0.73 dl/g);

Polyester 2: Polyethylene terephthalate (IV: 0.73 dl/g) in which $SiO_2$ (Sylysia 266 manufactured by Fuji Silysia Chemical Ltd.) was added as a lubricant at a ratio of 8,000 ppm to polyester in the production of the Polyester 1; and Polyester 3: In the production of the Polyester 1, an antimony catalyst was added in place of aluminum so as to be in an amount of 0.084 mol % (IV: 0.73 dl/g).

TABLE 1

| | Raw material composition of polyester (mol %) | | Amount of lubricant added (ppm) | IV (dl/g) | Antimony catalyst (mol %) |
|---|---|---|---|---|---|
| | Dicarboxylic acid component DMT | Polyhydric alcohol component EG | | | |
| Polyester 1 | 100 | 100 | 0 | 0.73 | 0 |
| Polyester 2 | 100 | 100 | 8000 | 0.73 | 0 |
| Polyester 3 | 98 | 100 | 0 | 0.73 | 0.084 |

DMT: Dimethyl terephthalate
EG: Ethylene glycol

Example 1

Polyester 1 and Polyester 2 described above were mixed at a weight ratio of 97:3 and introduced into an extruder. Then, this mixed resin was melted at 270° C., cooled to 260° C., extruded from a T-die, and wound around a rotating metal roll that was cooled to have a surface temperature of 30° C. to be rapidly cooled to obtain an unstretched film having a thickness of 220 μm. The take-up speed (rotational speed of the metal roll) of the unstretched film at this time was about 80 m/min. The unstretched film had a Tg of 75° C. and a Tm of 256° C. An adhesive sheet made of polyimide having high melting point was attached to the T-die to prevent volatile matters of the molten resin from falling off. In addition, a UV irradiation type cleaner was used to remove foreign substances that had fallen on the cooling roll.

The obtained unstretched sheet was heated to 115° C. and stretched in the longitudinal direction at a total stretch ratio of 4.5 times in three stages with a first stage at 1.24 times, a second stage at 1.4 times, and a third stage at 2.6 times. Subsequently, the film was stretched in the width direction at a temperature of 140° C. and a stretch ratio of 4.3 times, and subjected to a heat setting treatment at 243° C. and 5% heat relaxation treatment in the width direction. Next, after cutting and removing both ends of the resulting stretched film, the film was subjected to corona discharge treatment and wound into a roll with a winder, whereby a master roll of a biaxially-oriented polyester film having a thickness of 12 μm and a width of 8 m was produced.

The properties of the obtained film were evaluated by the above methods. The number of defects was evaluated by the above method with a roll obtained by slitting the master roll into a width of 800 mm and a winding length of 10000 m. The film production method is shown in Table 2, and the evaluation results are shown in Table 3. The obtained film contained a sufficiently small amount of antimony so that hygiene could be ensured, and had excellent printing appearance with a small number of defects. Therefore, the film was a satisfactory film.

Example 2

A biaxially-oriented polyester film roll was obtained in the same manner as in Example 1 except that Polyester 1 and Polyester 2 were mixed at a weight ratio of 99.5:0.5 and introduced into an extruder. The film production method is shown in Table 2, and the evaluation results are shown in Table 3. The obtained film was a good-quality film with higher transparency than that of Example 1. In addition, the film had only a small number of printing omissions.

Example 3

A biaxially-oriented polyester film roll was obtained in the same manner as in Example 1 except that Polyester 1, Polyester 2, and Polyester 3 were mixed at a weight ratio of 96.5:3:0.5 and introduced into an extruder. The film production method is shown in Table 2, and the evaluation results are shown in Table 3. Although the amount of antimony in the film slightly increased and the number of defects in the film slightly increased as compared with Example 1, the obtained film was a good-quality film with a sufficiently small number of defects.

Comparative Example 1

A biaxially-oriented polyester film roll was obtained in the same manner as in Example 1 except that Polyester 3 and Polyester 2 were mixed at a weight ratio of 97:3 and introduced into an extruder. The film production method is shown in Table 2, and the evaluation results are shown in Table 3. The amount of antimony and the number of defects in the film increased as compared with Example 1, and the obtained film was a film of inferior quality. In addition, the number of printing omissions also increased as compared with Example 1, and the film showed inferior results.

Comparative Example 2

Polyester 1, Polyester 2, and Polyester 3 were mixed at a weight ratio of 48.5:3:48.5 and introduced into an extruder. Then, a biaxially-oriented polyester film roll was obtained in the same manner as in Example 1 except that the mixed resin was melted at 280° C., cooled to 270° C., and extruded from a T-die. The properties of the obtained film were evaluated in the same manner as in Example 1. The film production method is shown in Table 2, and the evaluation results are shown in Table 3. As a result of the evaluation, the intrinsic viscosity significantly reduced, and the number of defects also increased. The obtained film was a biaxially-oriented polyester film of inferior quality.

TABLE 2

| | Resin composition (Weight ratio) | Glass transition temperature of raw material (° C.) | Melting point of raw material (° C.) | Extrusion process Extrusion temperature (° C.) | Longitudinal stretching process Stretch ratio | Transverse stretching process | | | |
|---|---|---|---|---|---|---|---|---|---|
| | | | | | | Stretch temperature (° C.) | Stretch ratio | Heat treatment temperature (° C.) | Relaxation ratio (%) |
| Example 1 | Polyester 1:Polyester 2 = 97:3 | 75 | 256 | 260 | 4.5 | 140 | 4.3 | 243 | 5 |
| Example 2 | Polyester 1:Polyester 2 = 99.5:0.5 | 75 | 256 | 260 | 4.5 | 140 | 4.3 | 243 | 5 |
| Example 3 | Polyester 1:Polyester 2:Polyester 3 = 96.5:3:0.5 | 75 | 256 | 260 | 4.5 | 140 | 4.3 | 243 | 5 |
| Comparative Example 1 | Polyester 2:Polyester 3 = 3:97 | 75 | 256 | 260 | 4.5 | 140 | 4.3 | 243 | 5 |
| Comparative Example 2 | Polyester 1:Polyester 2:Polyester 3 = 48.5:3:48.5 | 75 | 256 | 270 | 4.5 | 140 | 4.3 | 243 | 5 |

TABLE 3

| | Thickness (μm) | Content of antimony (ppm) | Content of phosphorus (ppm) | IV (dl/g) | IV difference (raw material-film) (dl/g) | Number of defects (per 1000 square meters) | Number of printing omissions (per 1000 square meters) | Haze (%) | Heat-shrinkage ratio measured at 150° C. for 15 minutes (%) | | Irregularity of thickness (%) | |
|---|---|---|---|---|---|---|---|---|---|---|---|---|
| | | | | | | | | | Longitudinal direction | Transverse direction | Longitudinal direction | Transverse direction |
| Example 1 | 12 | 0 | 36 | 0.69 | 0.04 | 0.1 | 0.1 | 2.2 | 1.6 | 0.1 | 3 | 3 |
| Example 2 | 12 | 0 | 36 | 0.69 | 0.04 | 0.1 | 0.1 | 1.1 | 1.6 | 0.1 | 3 | 3 |
| Example 3 | 12 | 1 | 36 | 0.69 | 0.04 | 0.3 | 0.2 | 2.2 | 1.6 | 0.1 | 3 | 3 |
| Comparative Example 1 | 12 | 145 | 36 | 0.69 | 0.04 | 1.1 | 1 | 2.4 | 1.6 | 0.1 | 3 | 3 |
| Comparative Example 2 | 12 | 71 | 36 | 0.65 | 0.08 | 1.5 | 1.2 | 2.3 | 1.6 | 0.1 | 3 | 3 |

INDUSTRIAL APPLICABILITY

The biaxially-oriented polyester film of the present invention has an extremely low content of antimony and is excellent in printability, workability, and productivity, and therefore is suitable for foodstuff packaging bags and labels with excellent hygiene.

The invention claimed is:

1. A biaxially-oriented polyester film satisfying the following requirements (1) to (7):
    (1) a content of antimony in the film is 10 ppm or less;
    (2) a content of phosphorus in the film is 25 ppm or more and 75 ppm or less;
    (3) an intrinsic viscosity of the film is 0.51 dl/g or more and 0.70 dl/g or less;
    (4) a number of defects with a size of 1 mm or more is 1.0 or less per 1000 square meters of the film;
    (5) the film contains no titanium compounds;
    (6) the film contains no germanium compounds; and
    (7) a content of aluminum in the film is 1 to 80 ppm; and
wherein the polyester film is formed with a polyester resin as a polyester raw material containing at least one selected from aluminum compounds and at least one selected from phosphorus compounds as polymerization catalysts.

2. The polyester film according to claim 1, wherein the film has a haze of 1% or more and 8% or less.

3. The polyester film according to claim 1, wherein the film has a heat-shrinkage ratio in a longitudinal direction of 0.8% or more and 3% or less, measured at 150° C. for 15 minutes.

4. The polyester film according to claim 1, wherein the film has a value of irregularity of thickness in each of a longitudinal direction and a transverse direction of 1% or more and 10% or less, measured over a length of 1 m with a continuous contact-type thickness gauge.

5. The polyester film according to claim 4, wherein the film has a haze of 1% or more and 8% or less.

6. The polyester film according to claim 2, wherein the film has a heat-shrinkage ratio in a longitudinal direction of 0.8% or more and 3% or less, measured at 150° C. for 15 minutes.

7. The polyester film according to claim 6, wherein the film has a value of irregularity of thickness in each of a longitudinal direction and a transverse direction of 1% or more and 10% or less, measured over a length of 1 m with a continuous contact-type thickness gauge.

8. A packaging bag including one or more layers, wherein at least one of the layer is the biaxially-oriented polyester film according to claim 1.

9. A label including one or more layers, wherein at least one of the layer is the biaxially-oriented polyester film according to claim 1.

10. A method for producing the biaxially-oriented polyester film according to claim 1, the method comprising the steps of:
    melt-extruding a raw material polyester resin such that a difference between an intrinsic viscosity of the raw material polyester resin and an intrinsic viscosity of the polyester film is 0.06 dl/g or less,
    cooling and solidifying the obtained extruded resin film to obtain an unstretched film, biaxial stretching the unstretched film, and
    heat setting the obtained biaxial stretched film.

* * * * *